United States Patent
Giampa et al.

(10) Patent No.: US 7,462,235 B2
(45) Date of Patent: Dec. 9, 2008

(54) SYSTEM AND METHOD FOR DECOMPOSING AMMONIA FROM FLY ASH

(75) Inventors: Vincent M. Giampa, Apollo Beach, FL (US); Joseph W. Cochran, Palm Harbor, FL (US)

(73) Assignee: Progress Materials, Inc., St. Petersburg, FL (US)

( * ) Notice: Subject to any disclaimer, the term of this patent is extended or adjusted under 35 U.S.C. 154(b) by 22 days.

(21) Appl. No.: 11/416,099

(22) Filed: May 3, 2006

(65) Prior Publication Data

US 2007/0256601 A1 Nov. 8, 2007

(51) Int. Cl.
*C04B 18/08* (2006.01)

(52) U.S. Cl. .................. 106/705; 106/DIG. 1; 423/237

(58) Field of Classification Search ................ 423/237; 106/DIG. 1, 705
See application file for complete search history.

(56) References Cited

U.S. PATENT DOCUMENTS

| | | | |
|---|---|---|---|
| 2,546,570 A | 3/1951 | Vance | |
| 2,576,565 A | 11/1951 | Brown | |
| 3,328,180 A | 6/1967 | Ban | |
| 3,799,474 A | 3/1974 | Scharzler | |
| 3,825,501 A | 7/1974 | Muenger | |
| 3,979,168 A | 9/1976 | Chauvin | |
| 4,003,986 A | 1/1977 | Lewis, Jr. | |
| 4,034,063 A | 7/1977 | Rosar et al. | |
| 4,043,831 A | 8/1977 | Friedman | |
| 4,064,219 A | 12/1977 | Yamashita et al. | |
| 4,121,945 A | 10/1978 | Hurst et al. | |
| 4,304,659 A | 12/1981 | Pratt et al. | |
| 4,325,833 A | 4/1982 | Scott | |
| 4,341,623 A | 7/1982 | Bertolacini et al. | |
| 4,705,409 A | 11/1987 | Trerice | |
| 4,911,900 A * | 3/1990 | Horch et al. ................ 423/235 |
| 4,959,334 A | 9/1990 | Mauleon et al. | |
| 5,051,245 A | 9/1991 | Wilson et al. | |
| 5,066,627 A | 11/1991 | Owen et al. | |

(Continued)

FOREIGN PATENT DOCUMENTS

DE 26 11 213 A 3/1976

(Continued)

OTHER PUBLICATIONS

Answer 296 of 406 of Chem Abstracts on STN☐☐☐☐DE 3802884 (Hilgraf) Aug. 10, 1989, abstract only.*

(Continued)

*Primary Examiner*—Paul Marcantoni
(74) *Attorney, Agent, or Firm*—Nixon Peabody LLP

(57) ABSTRACT

A system and method for decomposing ammonia from fly ash contaminated with ammonia is provided which includes maintaining the temperature of a bed of ammonia-contaminated fly ash at a decomposition temperature greater than 500° F. and less than 842° F. to decompose the ammonia from the fly ash. In a preferred embodiment, the ammonia-laden fly ash is maintained at a temperature less than a lowest carbon combustion temperature at which substantial combustion of carbon in fly ash begins to occur. A preferred embodiment includes a first chamber operating at a decomposition temperature greater than 500° F. and less than 842° F. followed by a second chamber operating at a higher carbon combustion temperature for carbon burn-out.

12 Claims, 5 Drawing Sheets

U.S. PATENT DOCUMENTS

| | | | |
|---|---|---|---|
| 5,069,720 A | | 12/1991 | Epperly et al. |
| 5,160,539 A | * | 11/1992 | Cochran ................ 106/DIG. 1 |
| 5,273,727 A | | 12/1993 | Johnson |
| 5,399,194 A | * | 3/1995 | Cochran et al. ............. 106/405 |
| 5,525,317 A | | 6/1996 | Bhat et al. |
| 6,077,494 A | | 6/2000 | Gasiorowski et al. |
| 6,290,066 B1 | | 9/2001 | Hwang |
| 6,422,392 B1 | * | 7/2002 | Levy ........................... 209/11 |
| 6,605,263 B2 | | 8/2003 | Alix et al. |
| 6,746,654 B2 | | 6/2004 | Mehta et al. |
| 6,755,901 B1 | | 6/2004 | Ramme et al. |
| 6,783,585 B2 | | 8/2004 | Zacarias et al. |
| 6,790,264 B2 | | 9/2004 | Minkara |
| 6,863,875 B1 | | 3/2005 | Kotake et al. |
| 7,223,375 B1 | | 5/2007 | Cochran |
| 2002/0189497 A1 | | 12/2002 | Tranquilla |
| 2003/0202927 A1 | | 10/2003 | Minkara et al. |
| 2004/0033184 A1 | | 2/2004 | Greer |
| 2004/0069186 A1 | * | 4/2004 | Zacarias et al. ............. 106/405 |
| 2007/0193476 A1 | | 8/2007 | Cochran et al. |

FOREIGN PATENT DOCUMENTS

| | | |
|---|---|---|
| DE | 35 26 756 A1 | 7/1985 |
| DE | 3526756 A1 * | 1/1987 |
| DE | 38 02 844 A1 | 11/1987 |
| DE | 3802884 A1 * | 8/1989 |
| EP | 0 227 196 B1 | 1/1987 |
| JP | 59059237 A | 4/1984 |
| SU | 734162 | 5/1978 |

OTHER PUBLICATIONS

Answer 327 of 406 of Chem Abstracts on STN☐☐☐☐DE 3526756 (Ruetten et al.) Jan. 29, 1987, abstract only.*

Answer 361 of 406 of Chem Abstracts on STN☐☐☐☐JP 57053224 (Electric Power Dvlpmt) Mar. 30, 1982, abstract only.*

Vincent M. Giampa, Ammonia Removal from Fly Ash by Carbon Burn-Out, 2000 Conference on Unburned Carbon on Utility Fly Ash, National Energy Technology Laboratory, Department of Energy, St. Petersburg, FL.

Vincent M. Giampa, Ammonia Removal from Coal Fly Ash by Carbon Burn-Out, 2001 Conference on Selective Catalytic Reduction (SCR) and Selective Non-Catalytic Reduction (SNCR) for NOx Control, National Energy Technology Laboratory, Department of Energy, St. Petersburg, FL.

Cheminfo: Ammonia Gas, Chemical Profiles Created by CCOHS, Canadian Centre for Occupational Health and Safety, www.worksafesask.ca/files/ccohs/cheminfo/cie48.html, printed Mar. 10, 2006.

Vincent M. Giampa, Ammonia Removal from Coal Fly Ash by Carbon Burn-Out, NETL Conference Proceedings, 2001, Pittsburg, PA, www.progressfuels.com/cbo/AmmoniaRemoval.html, printed Jun. 2, 2005.

W. Braker et al., Matheson Gas Products, Matheson Gas Data Book $6^{th}$ Edition, 1980, pp. 23-29.

Compressed Gas Association, Handbook of Compressed Gases $3^{Rd}$ Edition, 1990, pp. 231-252, Van Nostrand Reinhold Co.

T.A. Czuppon et al., Ammonia, Kirk-Othmer Encyclopedia of Chemical Technology $4^{th}$ Edition, 1992, pp. 678-710, vol. 2, John Wiley & Sons.

Kevin P. Resnik et al., Aqua Ammonia for Simultaneous Removal of $CO_2$, $SO_2$, And NO., Department of Energy, National Energy Technology Laboratory, Published: International Journal of Environmental Technology and Management, 2004, vol. 4 Nos. 1/2.

Frequently Asked Questions: American Coal Ash Association, website: www.acaa-usa.org/FAQ.htm, printed Jun. 1, 2005.

Ammonia, Environmental and Technical Information for Problem Spills, Jul. 1984, pp. 1-14, Technical Services Branch, Environmental Protection Service, Ottawa, ON, Canada.

Answer 296 of 406 of Chem Abstracts on STN, DE 3802884 (Hilgraf) Aug. 10, 1989 (abstract only).

Answer 327 of 406 of Chem Abstracts on STN, DE 3526756 (Ruetten et al.) Jan. 28, 1997 (abstract only).

Answer 361 of 406 of Chem Abstracts on STN, JP 57053224 (Electric Power Dvlpmt) (abstract only).

"Combustion: Fossil Power Systems," published by Combustion Engineering, Inc., 3rd Edition, 1981, p. 24-22, 24-23.

ASTM C618-05 "Standard Specification for Coal Fly Ash and Raw or Calcined Natural Pozzolan for Use in Concrete".

"Treatment of Mercury in Fly Ash by the CBO Process," by Joe Cochran and Vincent Giampa, Research Disclosure Journal, Jun. of 2003.

* cited by examiner

SYSTEM AND METHOD FOR DECOMPOSING AMMONIA FROM FLY ASH

BACKGROUND OF THE INVENTION

1. Field of the Invention

The present invention relates to a system and method for decomposing ammonia from fly ash contaminated with high levels of ammonia.

2. Description of Related Art

Utilities and operators of industrial boilers face challenges associated with implementing current and future regulations. In recent years, there has been increasing public and government concern over the environmental impact of nitrogen oxides ($NO_x$) emissions, which contribute to the environmental impact of acid rain. In order to meet the new $NO_x$ emission requirements, many utilities install pollution control equipment, using a combination of combustion management and post-combustion processes. Unintended consequences associated with the installation of pollution control equipment have surfaced.

Two approaches are typically used for the control of $NO_x$ emissions. These are combustion tuning and post combustion treatment of flue gas. Combustion tuning techniques include low $NO_x$ burners, over-fired air systems, reburning, and flue gas recirculation. Post combustion treatments include, but are not limited to, Selective Catalytic Reduction (SCR) and Selective Non-Catalytic Reduction (SNCR).

SCR and SNCR chemically reduce $NO_x$ to nitrogen and water. The difference between SCR and SNCR is that SCR utilizes a catalyst which allows the $NO_x$ reduction reaction to occur at a lower temperature. The two reagents most commonly used in SNCR systems are either ammonia or urea while SCR uses ammonia.

The generalized reaction when using ammonia is given by:

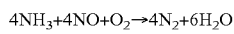

The reaction when using urea is given by:

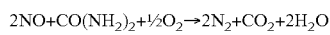

While ammonia has been used successfully to reduce nitrogen oxide emissions, the ammonia is typically introduced in excess of the reaction requirement and is not totally consumed. These fugitive ammonia emissions are called ammonia slip. SCR systems typically operate with ammonia slip values in the 5 ppm range while SNCR systems operate considerably higher. Ammonia slip can be expected to vary widely depending on changes in operating conditions. Some of the slip reports to the gas stream and some to the combustion by-products. Therefore, residues from the combustion process such as fly ash and other combustion by-products will contain ammonia and/or ammonia compounds, such as ammonium sulfate, ammonium bisulfate, ammonium chloride, ammonium hydroxide and ammonium carbonate.

Ammonia slip results in a significant portion of the ammonia compounds being deposited on fly ash. European SCR operation data indicates that combustion of coal in the 6-8% ash range with slip values of 2 ppmv in the flue gas results in concentrations of approximately 100 ppmw as ammonia on fly ash (i.e.—the concentration of the actual compound such as ammonium sulfate is higher, but only the ammonia fraction is of interest, so it is expressed as ppmw of ammonia). Low $NO_x$ operations using the SNCR technique commonly produce ammonia concentrations on fly ash in the 1000 ppm range. As more post combustion $NO_x$ control systems are placed in operation, increasing amounts of fly ash will contain ammonia.

Requirements for reduction of emissions from coal combustion have often resulted in the coupling of two or more pollution control devices. For example, SCR for reduction of $NO_x$ is combined with flue gas desulfurization (FGD or "scrubbers") for reduction of sulfur dioxide emissions. The coupling of these two devices has resulted in the unintended consequence of increasing the $SO_3$ emissions of the host utility.

During coal combustion, the majority of sulfur in the coal is converted to $SO_2$, with a small percentage of that being further oxidized to $SO_3$. The use of SCR for the control of NO emissions directs the hot $SO_2$ laden flue gas in the 700° F. temperature range through the SCR system. The vanadium containing catalyst commonly associated with SCR systems also serves as a catalyst for the oxidation of $SO_2$ to $SO_3$. This results in a significant portion of the $SO_2$ in the flue gas being oxidized to $SO_3$. Compounding this problem is the fuel market's current tendency toward utilization of fuels with higher sulfur content which produce higher $SO_2$ concentrations in the flue gas.

Before the $SO_3$ containing flue gas is released into the atmosphere, the flue gas passes through a FGD system which in many cases is inefficient in the capture of $SO_3$. This results in emissions of $SO_3$, the precursor of "Blue Plume". Blue Plume is formed when $SO_3$ is converted to sulphuric acid ($H_2SO_4$) mist. Sulfuric acid is formed as $SO_3$ aerosols cool as they enter the atmosphere and combine with moisture from the ambient environment. Because $H_2SO_4$ within a plume, flowing from a stack, is heavier than air, the plume's direction, which was previously upward, changes to an undesirable lateral, or even downward, direction. The visible effect of this phenomena is referred to as "Blue Plume." Thus, while SCR reduces $NO_x$ emissions, it may increase $SO_3$ emissions.

Ammonia can also be used to control Blue Plume. Utilities can inject ammonia into the flue gas stream, usually before the electrostatic precipitator used for control of particulate matter emissions to reduce Blue Plume and visible emissions associated with the $SO_3$.

In this process the injected ammonia reacts chemically with the $SO_3$ in the flue gas producing ammonium sulfate (and possibly small amounts of ammonium bisulfate). The ammonium sulfate combines with the fly ash and is captured by the electrostatic precipitator or other fly ash collection devices. Depending on the $SO_3$ concentration in the flue gas, this process uses ammonia quantities well above any prior art levels and can produce fly ash ammonia concentrations in the 8,000 ppmw range.

The deposition of ammonia and ammonia compounds on combustion by-products such as fly ash can cause problems for its beneficial use. Fly ash has been used successfully for many years in concrete mix designs. The use of fly ash in concrete is the largest single application for fly ash in the United States. In 2002 over 14 million tons of fly ash were used as a replacement for Portland cement in concrete applications. However, excess ammonia concentrations can result in the fly ash becoming unusable due to the odor nuisance and possible worker safety issues. When ammonia containing fly ash is used as a partial replacement for Portland cement, the soluble ammonia compounds contact the wet, alkaline cement matrix which results in the generation of ammonia vapor. Ammonia vapor is produced by the following generalized reaction:

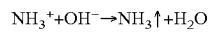

Fly ash with high levels of ammonia can be unsuitable for recycling purposes and may cause additional concerns, such as adverse environmental consequences of placing the ammonia laden ash in a landfill. Accordingly, it is important to reduce or remove ammonia and ammonia compounds from combustion by-products such as fly ash prior to their utilization in other applications.

In addition, the concrete industry has placed limits on the amount of ammonia that can be used in fly ash. When fly ash is used at a twenty percent by weight replacement in a concrete mix design (i.e.—20% of the Portland cement is replaced by fly ash), fly ash ammonia levels below 100 ppm are acceptable. When a higher percentage of fly ash is desired in the mix design, the ammonia concentration of the fly ash must be decreased accordingly. In order to use the fly ash in concrete, the ammonia content of the fly ash should desirably be below 60-80 ppm.

Various methods have been used to reduce the levels of ammonia in fly ash. These methods typically involve either adding chemicals to the fly ash, which will then contaminate the fly ash with another chemical while removing the ammonia, or washing the fly ash with water to remove the ammonia (by dissolving the soluble ammonia compounds), producing ammonia-laden water. Another method is described in "Ammonia Removal From Fly Ash Using Carbon Burn-Out". This paper suggests that fly ash residence times of 45 minutes and temperatures in the 1300° F. range are characteristic of the carbon burn-out process, and that carbon burn-out conditions should be ideal for ammonia removal. The paper reports that tests results indicate that under normal carbon burn-out operating conditions essentially all ammonia was removed liberated from the fly ash material. However, use of the CBO process is only appropriate for certain types of fly ash needing the carbon reduction for which the process was designed.

Therefore, there is still a need for a method of removing the ammonia from a very wide range of ammonia-contaminated fly ash without introducing other chemicals to the fly ash or increasing air or water emissions.

SUMMARY OF THE INVENTION

The present invention is a method and system for the removal of ammonia from fly ash. This is accomplished by maintaining the temperature of a fluidized bed of ammonia-laden fly ash at a decomposition temperature greater than 500° F. and less than 842° F. resulting in the decomposition of the ammonia from the fly ash. The gas emissions of the present invention are low in ammonia and $NO_x$ content. The method of removing ammonia from fly ash, in accordance with the present invention, includes providing a chamber and a supply of ammonia-laden fly ash, introducing the supply of ammonia-laden fly ash into the chamber at a temperature below 842° F., fluidizing the supply of ammonia-laden fly ash, maintaining the supply of ammonnia-laden fly ash from the chamber. temperature greater than 500° F. and less than 842° F. to decompose the ammonia in the ammonia-laden fly ash, and removing the resultant ammonia-free fly ash from the chamber. The system of the present invention for removing ammonia from ammonia-laden fly ash likewise includes a chamber to receive the ammonia-laden fly ash, wherein the chamber is adapted to maintain the ammonia-laden fly ash at a decomposition temperature greater than 500° F. and less than 842° F. to decompose the ammonia in the ammonia-laden fly ash.

The method and system of the present invention may also include maintaining the ammonia-laden fly ash at a temperature less than a lowest carbon combustion temperature at which substantial combustion of carbon in fly ash begins to occur. A temperature control unit may be used for controlling the temperature of the supply of ammonia-laden fly ash. The temperature control unit may comprise a controller, a thermocouple, and a heat source. The heat source may be any one of, or a combination of, the following: hot fly ash, hot exhaust gas, a heated air input, and a liquefied petroleum gas burner.

A preferred embodiment of the present invention includes providing a second chamber, introducing the resultant ammonia-free fly ash from the first chamber into the second chamber, increasing the temperature of the resultant ammonia-free fly ash to a carbon combustion temperature at which substantial combustion of carbon in the fly ash occurs, and maintaining the resultant ammonia-free fly ash at the carbon combustion temperature to remove the carbon from the fly ash.

DETAILED DESCRIPTION OF THE INVENTION

Figure 1:
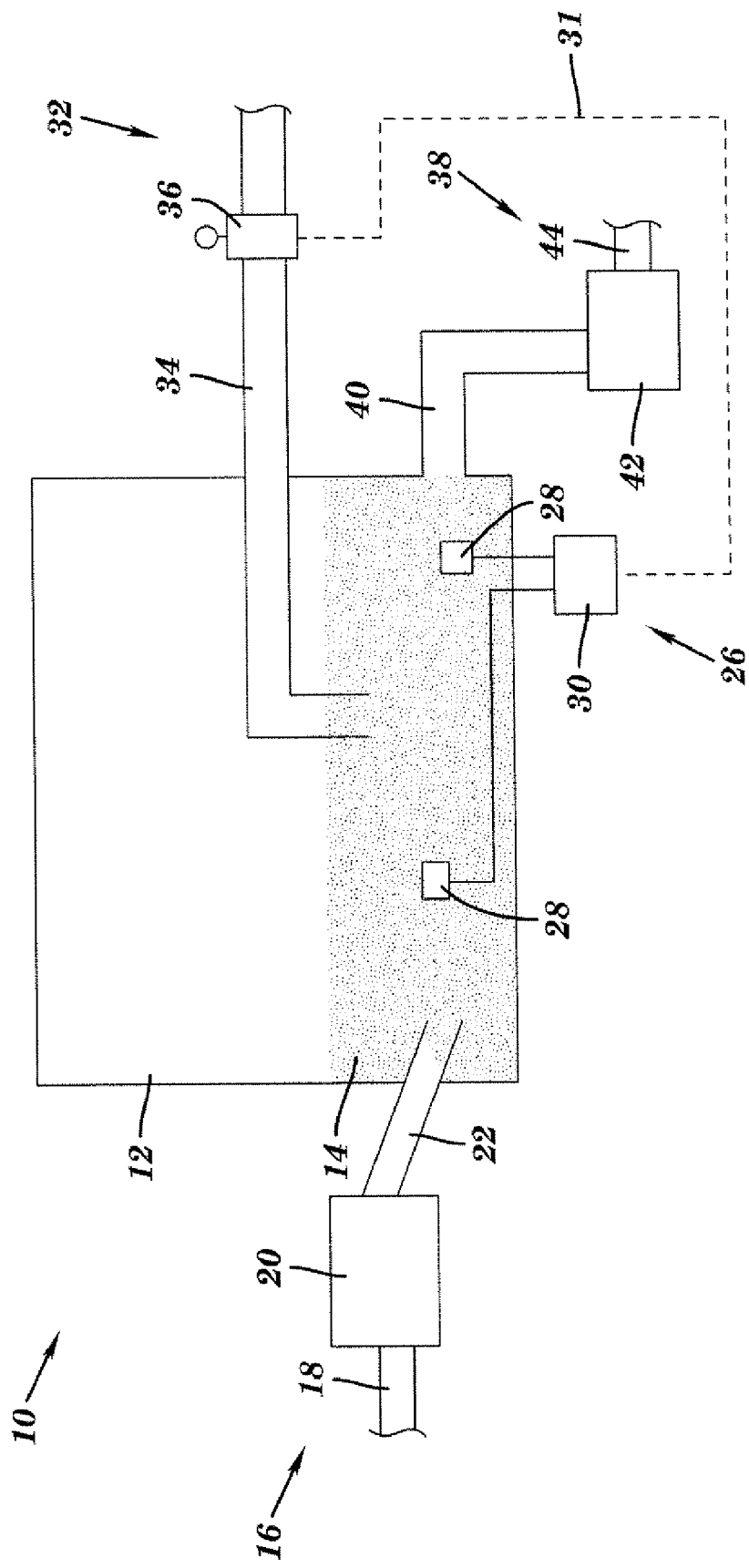
FIG. 1 is a view of a fluidized fly ash bed in accordance with the invention.

Referring to the drawings, and initially to FIG. 1, the system of the present invention, indicated generally at 10, and the method of the present invention, use fly ash for the decomposition of ammonia in fly ash. The system 10 and method of the present invention include heating a fluidized bed of coal fly ash and injecting a stream of ammonia-contaminated fly ash into the fly ash bed. Heat can be supplied by the fly ash residual carbon or by supplemental fuel. The system 10 includes a chamber 12 for receiving fly ash to form a fly ash bed 14. The fluidized bed system may be any system capable of providing sufficient fly ash particle contact while controlling the operational temperature of the fly ash, which is an important factor for optimizing the efficiency of the ammonia decomposition process.

A preferred fluid bed system for use with the present invention is described in detail in commonly owned U.S. Pat. No. 5,160,539 to Cochran, hereby incorporated by reference for structure and base functionality except as modified herein. In particular, as described herein below, the temperature of the bed of the present invention is maintained at a substantially different level than that taught and required by the carbon burn-out process of U.S. Pat, No. 5,160,539, and maintained below a temperature previously thought to be required for ammonia decomposition.

Specifically, the chamber 12 shown in FIG. 1 is a box-shape, but the chamber 12 may be any enclosure with a shape capable of accommodating the appropriate fluid bed properties of temperature, residence time and bed flow, including elongated, spherical, cylindrical, etc. A supply of ammonia-laden fly ash is added to the fly ash bed 14 through the fly ash input 16. Fly ash input 16 includes inflow line 18, fly ash injector 20, and injector line 22. The supply of ammonia-laden fly ash of fly ash bed 14 is introduced into chamber 12 through injector line 22 by fly ash injector 20. The input of fly ash through injector line 22 may be regulated by a valve or other regulating device (not shown), or may be regulated by fly ash injector 20, which can be of any suitable type such as a rotary feeder. The supply of ammonia-laden fly ash may be received through inflow line 18 directly from a combustion process, may be received from another facility, or may be received from a stored supply of fly ash.

The temperature of bed 14 and chamber 12 is controlled and measured by a temperature control unit 26, which includes one or more thermocouples 28, or other suitable devices for measuring temperature, a controller 30, and a heat source 32. Thermocouples 28 are located preferably inside chamber 12, and preferably inside fly ash bed 14. Controller 30 receives signals from thermocouples 28 and generates and sends control signals via connection 31 to a heating device, such as a valve or burner discussed hereinbelow. Controller 30 may be a computer that measures and controls the temperature, using heat source 32 connected to controller 30, according to an algorithm, or may be a simpler closed-loop feedback control device that connects directly to heat source 32 in order to control the temperature of fly ash bed 14, according to the temperature measured by thermocouples 28.

The most preferred heat source 32 is hot fly ash from a hot fly ash supply line 34 which is fed hot fly ash from an upstream process or system which generates hot fly ash, such as the process of U.S. Pat. No. 5,160,539. The hot fly ash from supply line 34 is received from the hot process and added directly to fly ash bed 14. Although the figure shows hot fly ash supply line 34 adding fly ash to the center of fly ash bed 14, hot fly ash may be added at any location in fly ash bed 14 or chamber 12. The temperature of the hot fly ash may or may not be measured directly, but the temperature of fly ash bed 14 is measured by thermocouples 28 of temperature control unit 26, which controls the rate and amount of input of the hot fly ash. The rate and amount of hot fly ash via supply line 34 is regulated by a valve 36 or by some other flow control device, under the control of controller 30, or through a simple closed loop system between thermocouples 28 and the flow control device, i.e. valve 36. By using hot fly ash from a combustion plant or hot fly ash from a carbon burn-out process, the process of the present invention enhances the thermal efficiency of the entire combustion process. Is should be noted that the hot fly ash from supply line 34 may be ammonia-laden fly ash, ammonia-free fly ash, carbon-laden fly ash, and/or carbon-free fly ash.

Fly ash that has been processed and cleaned of ammonia by the decomposition process of the present invention is removed from chamber 12 by the fly ash output 38. Fly ash output 38 includes an outflow line 40 which connects to a particle size classifier 42. The outflow line 40 is used to remove the processed fly ash from chamber 12. The flow of fly ash is regulated in order to control the flow of fly ash from chamber 12, controlling the level of fly ash in bed 14 and the residence time of the fly ash in fly ash bed 14 by temporarily increasing or decreasing flow. The processed, or resultant, fly ash is ammonia-free. This resultant fly ash is fed through outflow line 40 to particle size classifier 42 which serves to separate any oversized ash or other material from the resultant ash. The resultant ash is then discharged through outlet 44 while the oversized material is also discharged through a different outlet (not shown). It should be noted that classifier 42 may be omitted.

Figure 2:
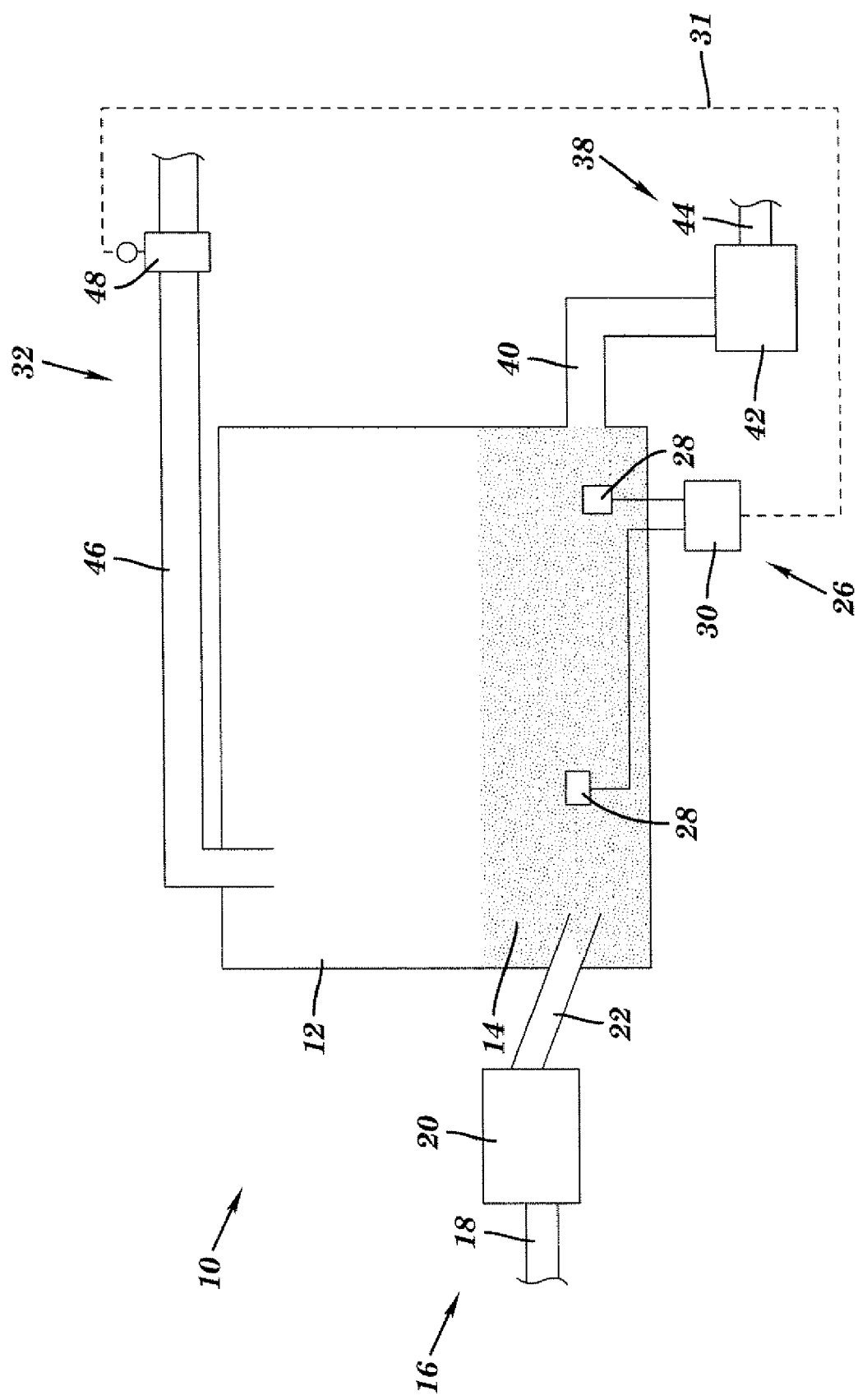
FIG. 2 is a view of an alternate embodiment of a fluidized fly ash bed in accordance with the invention.

FIG. 2 shows an alternative embodiment of the system and method of the present invention. The system of FIG. 2 is similar to the system of FIG. 1, but includes a different heat source 32 in the form of a supply of exhaust gas 46 received from another hot process located nearby, such as the carbon burn-out process of U.S. Pat. No. 5,160,539. Exhaust gas from supply 46 is received from the hot process and added directly to chamber 12. The temperature of the exhaust gas may or may not be measured directly, but the temperature of fly ash bed 14 is measured by thermocouples 28 of temperature control unit 26. Temperature signals from the thermocouples 28 are received and processed by controller 30, which in turn generates a control signal based on the temperature signals to control the rate and amount of input of exhaust gases 46. The rate and amount of exhaust gas is regulated by a valve 48 or by some other device which receives the control signal from controller 30 via connection 31 as shown. A simple closed loop system between thermocouples 28 and valve 48 may be used instead. The exhaust gas supply 46 can be used alone or in combination with another heat source, such as the hot fly ash from supply line 34 of FIG. 1. As described above, by using hot exhaust gases from a combustion plant or hot exhaust gases from a carbon burn-out process, the process of the present invention enhances the thermal efficiency of the entire combustion process.

Figure 3:
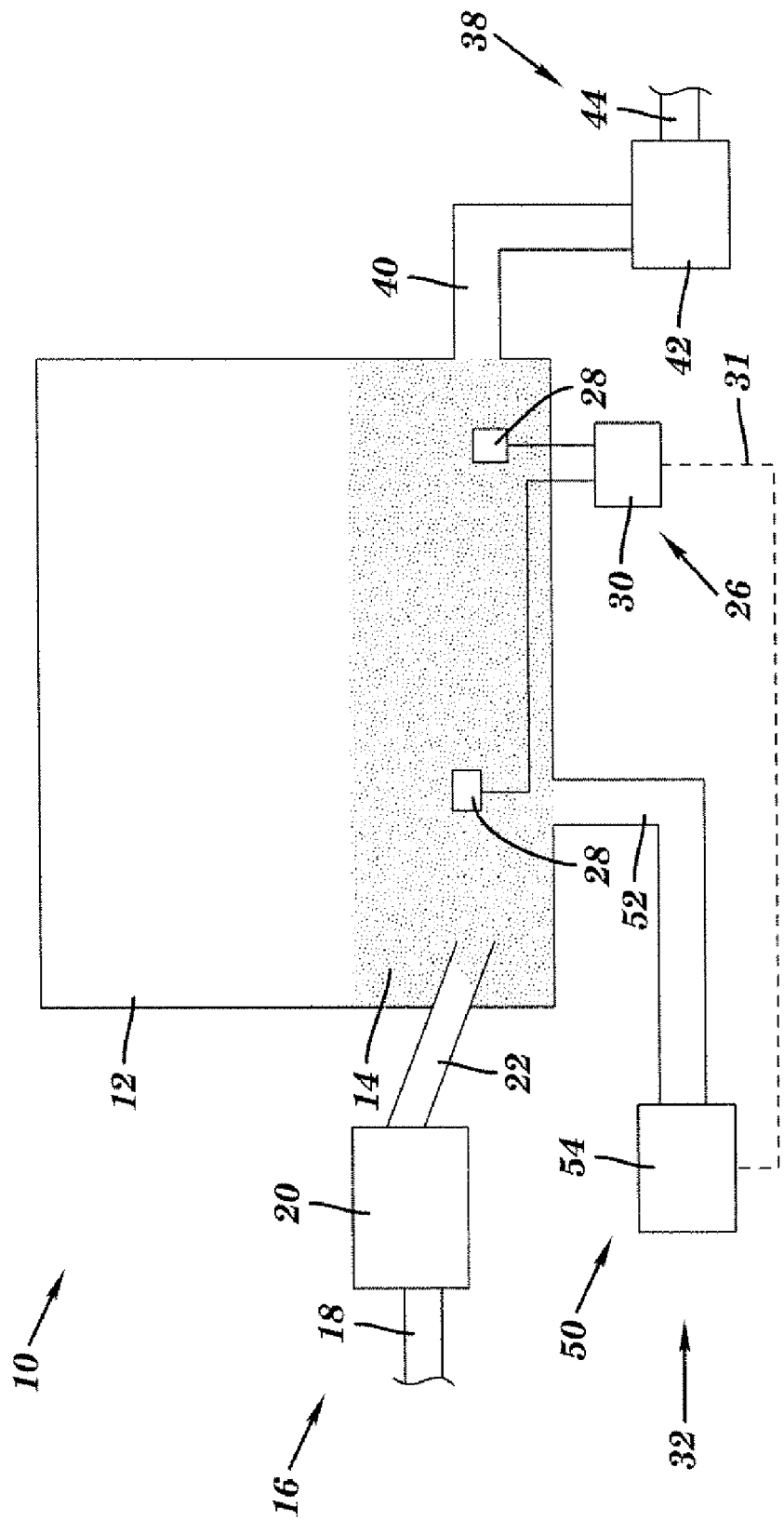
FIG. 3 is a view of an alternate embodiment of a fluidized fly ash bed in accordance with the invention.

FIG. 3 shows another embodiment of the system and method of the present invention. The system of FIG. 3 is similar to the system of FIG. 1, but includes a different heat source 32 comprising an air heater system 50 which includes an air delivery passage 52 and an air heater unit 54. The air heater unit 54 heats air, either by extracting heat from another source, such as from hot fly ash processed by the process of U.S. Pat. No. 5,160,539, through a heat exchanger or by heating air directly, and blows the air through air delivery passage 52 into chamber 12. Temperature control unit 26 controls the temperature of fly ash bed 14 through air heater system 50 by controlling the operation of air heater unit 54. Controller 30 generates control signals based on temperature signals received from thermocouples 28 to operate air heater unit 54 until fly ash bed 14 reaches a desired temperature and then control air heater unit 54 to maintain the bed temperature within a desired temperature range. A simple closed loop control between thermocouples 28 and the air heater system 50 may be used instead. As above, the air heater system 50 may be used as a single heat source or may be used in combination with one or both of the heat sources described in FIGS. 1 and 2.

Figure 4:
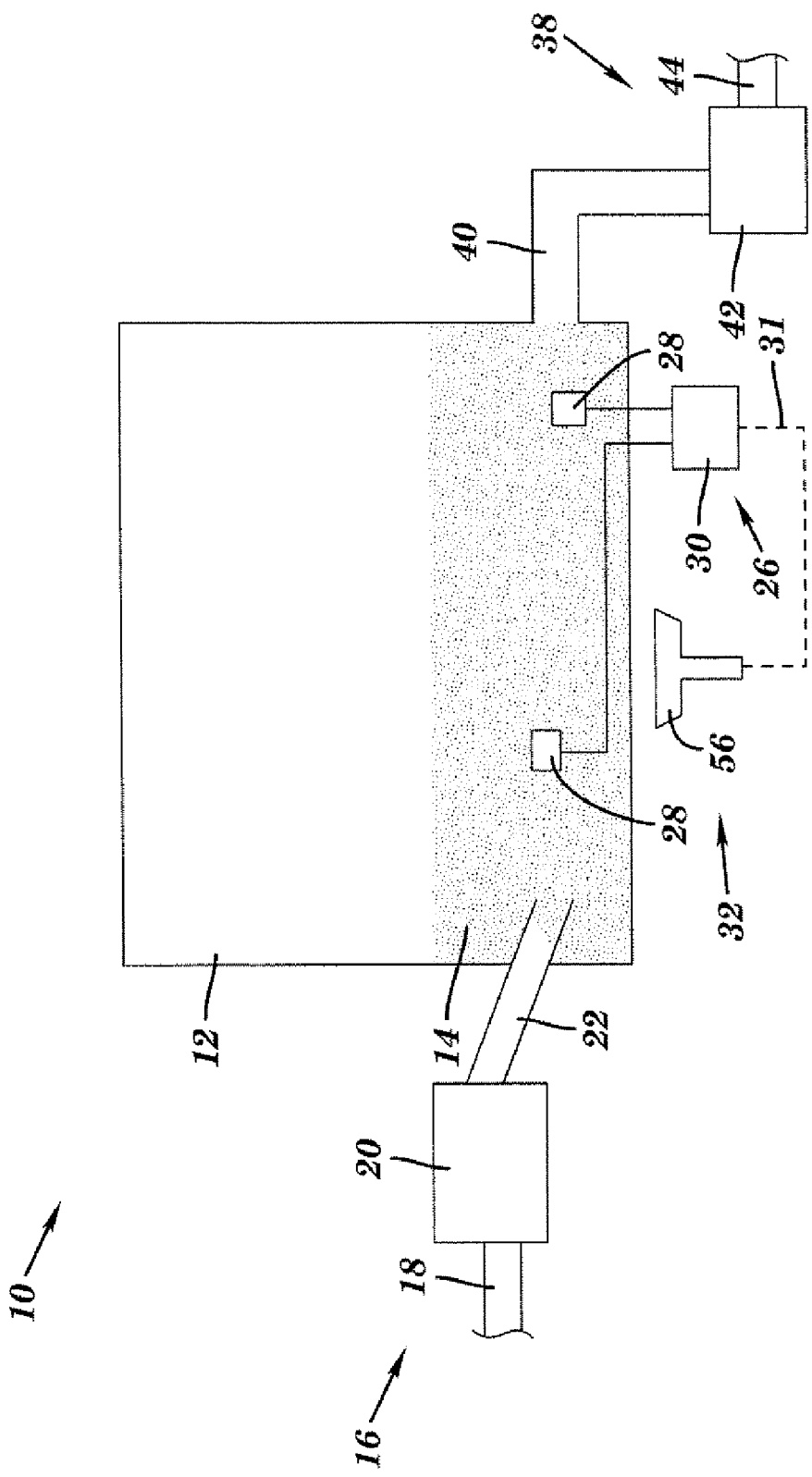
FIG. 4 is a view of an alternate embodiment of a fluidized fly ash bed in accordance with the invention.

FIG. 4 shows an alternative embodiment of the system of the present invention. The system of FIG. 4 is similar to the system of FIG. 1, but includes a different heat source 32 comprising an LPG or natural gas burner 56 which can be used, alone or in combination with other heat sources, to control the heat of chamber 12. Temperature control unit 26 controls the temperature of fly ash bed 14 by activating burner 56 until fly ash bed 14 reaches a desired temperature, and then, if necessary, controlling operation, e.g. modulating or activating and deactivating, burner 56 to maintain the bed temperature within a desired range. Simple closed loop control between thermocouples 28 and the burner 56 may be used instead.

In operation, the system 10 and method of the present invention receive a supply of fly ash contaminated with ammonia and remove the ammonia through decomposition. The supply of ammonia-laden fly ash, located in fly ash bed 14, is maintained at temperatures below the minimum temperature conventionally thought to be required to achieve ammonia decomposition. Specifically, it is known that ammonia decomposition occurs in the 842° F. to 932° F. range. The system 10, and method, of the present invention maintains the temperature of the fly ash in bed 14 below 842° F., i.e., preferably below approximately 840° F. and above 500° F. The fly ash particles are introduced into fly ash bed 14 within chamber 12 by fly ash injector 20 through injector line 22. The temperature of fly ash bed 14 is measured by thermocouples 28 which transmit temperature signals to temperature control unit 26. Temperature control unit 26 processes the temperature data and controls heat source 32 to adjust the temperature of fly ash bed 14.

At startup, relatively low temperature fly ash may be used so that temperature control unit 26 will send a control signal to heat source 32 to cause heat, such as hot fly ash from supply line 34, hot exhaust gas 46, heated air from air heater system 50, and/or heat from burner 56, to flow to chamber 12 to increase the temperature of fly ash bed 14. Heat from heat source 32 is added until chamber 12 and fly ash bed 14 reach a decomposition temperature within a desired temperature range, i.e. greater than 500° F. and less than 842° F. In order to provide vigorous and consistent bubbling of fly ash bed 14, fluidization is important. The fluidity of fly ash bed 14 is maintained by forced air through vents (not shown) in chamber 12. The forced air creates agitation that intermixes the particles and allows the ammonia decomposition and removal. As the particles of fly ash added by fly ash input 16 travel through fly ash bed 14 within the operative temperature range, they mix with the heated fly ash of fly ash bed 14, and the ammoniated compounds react to decompose the ammonia therein thereby reducing the ammonia content of the fly ash. Chamber 12 is sized, and the level of fly ash bed 14 therein controlled, so that the fly ash particles have sufficient residence time to effect ammonia decomposition. In a preferred embodiment, the residence time to accomplish ammonia decomposition is between several seconds and several minutes once the fly ash reaches the desired process temperature in the operative temperature range, i.e., greater than 500° F. and less than 842° F. The fly ash bed velocity of the present invention may be between 0.7 to 2.0 feet per second to provide adequate gas and particle contact. The processed fly ash particles exit fly ash bed 14 through outflow line 40. The fly ash processed by the system and method of the present invention has a sufficiently low ammonia content to permit use, without further processing, as a replacement for a portion of the cement in concrete. The processed fly ash has an ammonia content of less than approximately 60 ppm and preferably less than 40 ppm.

In the method and system of the present invention, as noted above, fly ash bed 14 is operated at a decomposition temperature greater than 500° F. and less than 842° F. Also, preferably, the temperature of the fly ash in bed 14 is also maintained at a temperature less than the lowest carbon combustion temperature at which substantial combustion of carbon in the fly ash begins to occur. The lowest carbon combustion temperature in fly ash varies depending on the particular carbon but is typically between 800° F. and 1000° F. Most preferably, therefore, the bed temperature is greater than 500° F. and less than about 800° F. to essentially preclude substantial combustion of carbon in the fly ash thereby minimizing $NO_x$ emissions. The operating temperature of system 10 is controlled and maintained by the temperature control unit 26, which may use one or more of the following heat sources: hot fly ash from supply line 34 from another hot process 38, hot exhaust gases 46 from another hot process, heated air from heated air supply 50, and heat from burner 56. It should be noted that temperature control unit 26 may be used to raise the temperature of the fly ash in chamber 12 to within the desired range and then not be used further if the bed temperature can be maintained without its use.

Figure 5:
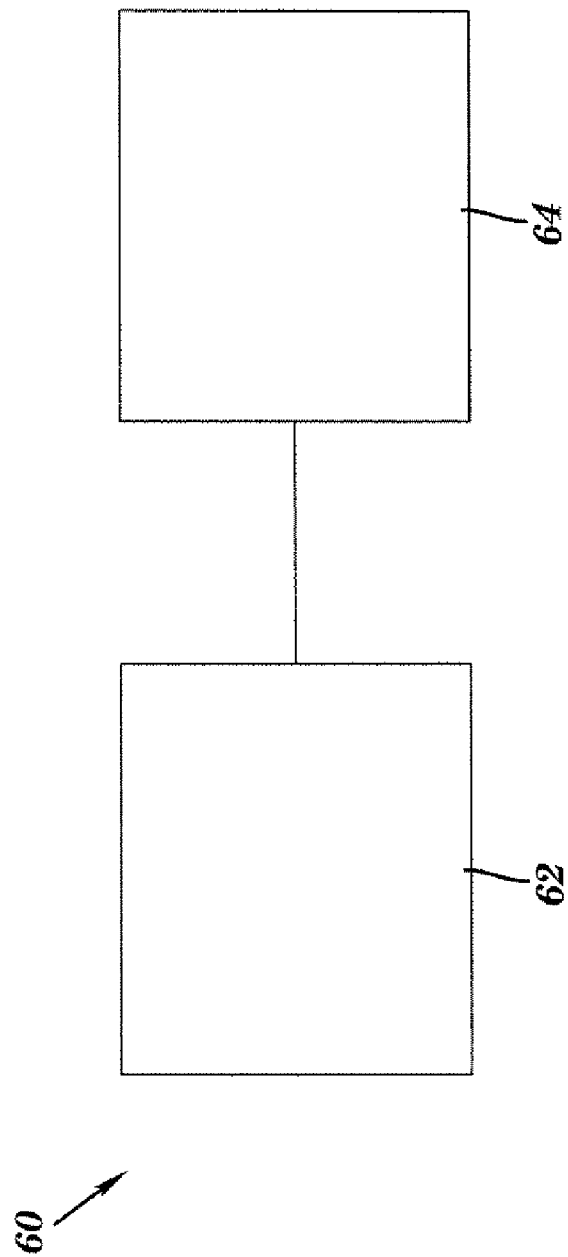
FIG. 5 is a view of a preferred embodiment of the present invention.

A preferred embodiment of the present invention would use two fly ash bed chambers each similar to chamber 12 of system 10 of FIG. 1 at two different temperatures, as shown in FIG. 5 at 60. Fly ash contaminated with ammonia, which may include fly ash contaminated with very high levels of ammonia, enters the first chamber 62. The first chamber 62 would operate in the desired decomposition temperature range of the present invention, i.e., greater than 500° F. and less than 842° F., to decompose the ammonia from the fly ash. The first chamber 62 would operate as described with respect to system 10 as shown in FIG. 1. Most preferably, the first chamber 62 would operate at temperatures greater than 500° F. and less than about 800° F. to essentially preclude substantial combustion of carbon in the fly ash thereby minimizing $NO_x$ emissions. Then the ammonia-free fly ash would proceed to the second chamber 64 that operates at or above the lowest combustion temperature of the carbon in the fly ash, i.e., at carbon combustion temperatures at which substantial carbon combustion occurs, such that a thermal beneficiation process such as the carbon burn-out process of U.S. Pat. No. 5,160,539 would remove the carbon from the fly ash. The second chamber 64 would operate as described with respect to system 10 as shown in FIG. 1, but with temperatures preferably between 1100° F. and 1500° F., thereby necessarily resulting in substantial combustion of the carbon. Normally during combustion, $NO_x$ is produced in part by the presence of $NH_3$ in the fly ash. However, in the present embodiment, by removing the $NH_3$ prior to combustion in second chamber 64, the $NO_x$ produced by the combustion in second chamber 64 will be significantly reduced. Therefore, the two-chamber system of FIG. 2 generates less $NO_x$ while producing ammonia-free fly ash for commercial use. It should be understood that second chamber 64 could be essentially the same in structure and function as the system of U.S. Pat. No. 5,160,539.

Of course, carbon-free ammonia-laden fly ash would only need to pass through the first chamber 62 to achieve ammonia decomposition without the need for the carbon burn-out process of second chamber 64. The method and system of the present invention, using only first chamber 62 at relatively low temperatures, still achieves substantially complete ammonia decomposition with little or no ammonia on the resultant fly ash and negligible ammonia in the resultant gas flowing from the system.

The system of the present invention, in any embodiment, may be retrofit into an existing combustion plant with some modifications, built directly into a new combustion plant, or developed as a separate facility for processing fly ash from a combustion plant.

In order to test the decomposition of ammonia, tests were performed at various temperatures. Temperatures examined during this investigation were between 500° F. and 1300° F. The fluid bed used was 48 inches in height. To simulate ammonia-laden fly ash, ammonium sulfate was injected into the middle of the bed, at 24 inches of bed height. The ammonium sulfate was introduced into the system at a rate that is sufficient to produce ammonia at concentrations of between about 4000 and 4350 ppmv in the flue gas passing through the fluidized bed. The results of this test are shown in Table 1.

TABLE 1

| Test No. | Bed Temp in ° F. | Bed Velocity in ft/sec | Ammonia Concentration Inlet ppmv | Ammonia Concentration Outlet ppmv | Ammonia Decomposition Efficiency |
|---|---|---|---|---|---|
| 1 | 1239-1289 | 1 | 4350 | 52 | 99 |
| 2 | 1099-1228 | 1 | 4350 | 44 | 99 |
| 3 | 990-1052 | 1 | 4350 | <40 | >99 |
| 4 | 878-952 | 1 | 4350 | <40 | >99 |
| 5 | 775-843 | 1 | 4350 | <40 | >99 |
| 6 | 706-764 | 1 | 4350 | <40 | >99 |
| 7 | 640-690 | 1 | 4350 | <40 | >99 |

TABLE 1-continued

| Test No. | Bed Temp in ° F. | Bed Velocity in ft/sec | Ammonia Concentration Inlet ppmv | Ammonia Concentration Outlet ppmv | Ammonia Decomposition Efficiency |
|---|---|---|---|---|---|
| 8 | 583-627 | 1 | 4000 | <40 | >99 |
| 9 | 526-567 | 1 | 4000 | <40 | >99 |

During this test, the fly ash carbon combustion rate was essentially negligible or nil because the carbon content of the ash was less than 0.5% (too little fuel for combustion) and did not diminish during the processing. Additionally, the temperatures during Tests 5 through 9 were in a low range where no combustion is likely occurring. Ammonium sulfate was introduced into the heated fly ash bed at different operational temperatures. Initially, the system was heated to about 1280° F. Then the system was allowed to cool, while ammonium sulfate solution was periodically injected into the system. The input exhaust gas concentration for this test was either 4350 or 4000 ppmv, with ammonia concentrations in the exhaust gas being monitored. After injection of the large amount of ammonia, the resultant flue gas was found to be substantially ammonia free, i.e., the flue gas contained less than 1% of the ammonia introduced into the system, with little to no detectable ammonia on the fly ash. In addition, the resultant flue gas was found to be substantially free of $NO_x$, i.e., less than 1% of the ammonia introduced into the system formed $NO_x$. At all temperatures, even temperatures at about 525° F., the ammonia was substantially completely decomposed.

This result is unexpected since complete ammonia decomposition occurred at temperatures far below the previously known ammonia decomposition temperature range. Ammonia normally decomposes at temperatures in the 842° F. to 932° F. range. The results of Table 1 indicate that ammonia decomposition is occurring even down to the 525° F. to 565° F. range, which is well below the normal decomposition temperature of ammonia. The ammonia decomposes into nitrogen and either hydrogen or water or both. Thus the system and method of the present invention advantageously permits the decomposition of ammonia, and thus removal of ammonia, from fly ash at temperatures not previously considered sufficient for ammonia decomposition, i.e., at unexpectedly lower temperatures. Applicant believes that the fly ash is unexpectedly acting as a catalyst to promote the decomposition of ammonia.

Thus, the system and method of the present invention advantageously decomposes ammonia from fly ash while minimizing heat input without substantial conversion of $NH_3$ to $NO_x$ emissions. Also, the present invention can provide the first stage of a two-stage process of removing ammonia from fly ash followed by the removal of carbon from the same fly ash while minimizing $NO_x$ emissions. The process of the present invention also avoids the use of chemical agents to remove ammonia from fly ash, thereby minimizing undesirable by-products.

It will of course be understood that the invention is not limited to the specific details described herein, which are given by way of example only, and that various modifications and alterations are possible within the scope of the invention.

We claim:

1. A method of removing ammonia from fly ash, the method comprising:
   providing a chamber;
   providing a supply of ammonia-laden fly ash;
   introducing the supply of ammonia-laden fly ash into the chamber at a temperature below 800° F.;
   fluidizing the supply of ammonia-laden fly ash;
   maintaining the supply of ammonia-laden fly ash at a decomposition temperature greater than 500° F. and less than 800° F. to decompose the ammonia in the ammonia-laden fly ash; and
   removing the resultant ammonia-free fly ash from the chamber.

2. The method of claim 1, further comprising:
   providing a second chamber;
   introducing the resultant ammonia-free fly ash into the second chamber;
   increasing the temperature of the resultant ammonia-free fly ash to a carbon combustion temperature at which substantial combustion of carbon in the fly ash occurs;
   fluidizing the resultant ammonia-free fly ash; and
   maintaining the resultant ammonia-free fly ash at the carbon combustion temperature to remove the carbon from the fly ash.

3. The method of claim 1, wherein the step of maintaining the supply of ammonia-laden fly ash at a decomposition temperature greater than 500° F. and less than 800° F. to decompose the ammonia in the ammonia-laden fly ash further includes maintaining the ammonia-laden fly ash at a temperature less than a lowest carbon combustion temperature at which combustion of carbon in fly ash begins to occur.

4. The method of claim 1, wherein the temperature of the supply of ammonia-laden fly ash is controlled by a temperature control unit.

5. The method of claim 4, wherein the temperature control unit comprises a controller, a thermocouple, and a heat source.

6. The method of claim 5, wherein the heat source is selected from a group consisting of: hot fly ash, hot exhaust gas, a heated air input, a liquefied petroleum gas burner and a natural gas burner.

7. The method of claim 1, wherein the resultant ammonia-free fly ash has an ammonia concentration of less than 60 ppm.

8. The method of claim 1, wherein the resultant ammonia-free fly ash has an ammonia concentration of less than 40 ppm.

9. The method in claim 1, wherein a resultant flue gas contains less than 1% of the ammonia introduced into the system.

10. The method of claim 1, wherein less than 1% of the ammonia introduced into the system forms $NO_x$.

11. The method of claim 2, wherein the temperature of the supply of ammonia-laden fly ash is controlled by a temperature control unit including a heat source selected from a group consisting of: hot fly ash, hot exhaust gas, a heated air input, a liquefied petroleum gas burner and a natural gas burner.

12. The method of claim 2, wherein less than 1% of the ammonia introduced into the system forms $NO_x$.

* * * * *